US012763392B2

(12) United States Patent
Zhang

(10) Patent No.: US 12,763,392 B2
(45) Date of Patent: Oct. 13, 2026

(54) BATTERY PACK WITH MULTI-LAYERED THERMAL ENERGY TRANSFER ASSEMBLY AND THERMAL ENERGY TRANSFER METHOD

(71) Applicant: Ford Global Technologies, LLC, Dearborn, MI (US)

(72) Inventor: Xiaogang Zhang, Novi, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 972 days.

(21) Appl. No.: 17/841,761

(22) Filed: Jun. 16, 2022

(65) Prior Publication Data

US 2023/0411726 A1 Dec. 21, 2023

(51) Int. Cl.

| | |
|---|---|
| ***H01M 10/613*** | (2014.01) |
| ***H01M 10/647*** | (2014.01) |
| ***H01M 10/6554*** | (2014.01) |
| ***H01M 10/6556*** | (2014.01) |
| ***H01M 10/6567*** | (2014.01) |
| ***H01M 10/658*** | (2014.01) |
| ***H01M 50/209*** | (2021.01) |
| *H01M 10/653* | (2014.01) |

(Continued)

(52) U.S. Cl.

CPC ....... *H01M 10/613* (2015.04); *H01M 10/647* (2015.04); *H01M 10/6554* (2015.04); *H01M 10/6556* (2015.04); *H01M 10/6567* (2015.04); *H01M 10/658* (2015.04); *H01M 50/209* (2021.01); *H01M 10/653* (2015.04); *H01M 10/6555* (2015.04); *H01M 10/6557* (2015.04); *H01M 2220/20* (2013.01); *Y02E 60/10* (2013.01)

(58) Field of Classification Search

CPC ............. H01M 10/613; H01M 10/625; H01M 10/647; H01M 10/653; H01M 10/6554; H01M 10/6555; H01M 10/6556; H01M 10/6557; H01M 10/6567; H01M 10/658; H01M 2220/20; H01M 50/209; Y02E 60/10

See application file for complete search history.

(56) References Cited

U.S. PATENT DOCUMENTS

| | | | |
|---|---|---|---|
| 8,785,026 | B2 | 7/2014 | Hu et al. |
| 10,910,683 | B2 | 2/2021 | Myers et al. |

(Continued)

FOREIGN PATENT DOCUMENTS

| | | | |
|---|---|---|---|
| CN | 108598625 | A | 9/2018 |

*Primary Examiner* — Lingwen R Zeng
(74) *Attorney, Agent, or Firm* — David B. Kelley; Carlson, Gaskey & Olds, P.C.

(57) ABSTRACT

A battery pack assembly includes a cell stack having a plurality of battery cells distributed along an axis and a plurality of thermal energy transfer assemblies distributed along the axis. Each thermal energy transfer assembly is disposed between axially adjacent battery cells within the plurality of battery cells. Each thermal energy transfer assembly includes a first sheet and a second sheet that sandwich an insulation layer. The battery pack assembly further includes a coolant plate assembly and a base sheet sandwiched between the coolant plate assembly and the cell stack. The base sheet is configured to communicate thermal energy from the first sheet and the second sheet to the coolant plate assembly.

20 Claims, 4 Drawing Sheets

(51) Int. Cl.

| | |
|---|---|
| *H01M 10/6555* | (2014.01) |
| *H01M 10/6557* | (2014.01) |

(56) References Cited

U.S. PATENT DOCUMENTS

| | | | | |
|---|---|---|---|---|
| 2011/0159340 | A1* | 6/2011 | Hu | H01M 10/617 429/120 |
| 2012/0148889 | A1* | 6/2012 | Fuhr | H01M 50/264 429/87 |
| 2015/0303535 | A1 | 10/2015 | White et al. | |
| 2020/0161722 | A1* | 5/2020 | Myers | B29C 65/606 |
| 2021/0257690 | A1 | 8/2021 | Kilhenny et al. | |

* cited by examiner

BATTERY PACK WITH MULTI-LAYERED THERMAL ENERGY TRANSFER ASSEMBLY AND THERMAL ENERGY TRANSFER METHOD

TECHNICAL FIELD

This disclosure relates generally to communicating thermal energy from a battery pack.

BACKGROUND

Electrified vehicles differ from conventional motor vehicles because electrified vehicles include a drivetrain having one or more electric machines. The electric machines can drive the electrified vehicles instead of, or in addition to, an internal combustion engine. A traction battery pack assembly can power the electric machines. The traction battery pack assembly of an electrified vehicle can include groups of battery cells.

SUMMARY

In some aspects, the techniques described herein relate to a battery pack assembly, including: a cell stack including a plurality of battery cells distributed along an axis and a plurality of thermal energy transfer assemblies distributed along the axis, each thermal energy transfer assembly disposed between axially adjacent battery cells within the plurality of battery cells, each thermal energy transfer assembly including a first sheet and a second sheet that sandwich an insulation layer; a coolant plate assembly; and a base sheet sandwiched between the coolant plate assembly and the cell stack, the base sheet configured to communicate thermal energy from the first sheet and the second sheet to the coolant plate assembly.

In some aspects, the techniques described herein relate to a battery pack assembly, wherein the first sheet and the second sheet are connected directly to the base sheet.

In some aspects, the techniques described herein relate to a battery pack assembly, wherein the base sheet is a first material, and the coolant plate assembly is a different, second material.

In some aspects, the techniques described herein relate to a battery pack assembly, wherein the first material includes copper, wherein the second material includes aluminum.

In some aspects, the techniques described herein relate to a battery pack assembly, wherein the first sheet and the second sheet are copper.

In some aspects, the techniques described herein relate to a battery pack assembly, wherein the coolant plate assembly includes paths configured to communicate a liquid coolant.

In some aspects, the techniques described herein relate to a battery pack assembly, wherein the first sheet and the second sheet are each in direct contact with an axially facing side of a respective one of the battery cells.

In some aspects, the techniques described herein relate to a battery pack assembly, wherein the coolant plate assembly include a first plate, a second plate spaced a distance from the first plate, and a plurality of fins extending between the first plate and the second plate, wherein the coolant plate assembly is configured to communicate coolant between the first plate and the second plate.

In some aspects, the techniques described herein relate to a battery pack assembly, wherein the plurality of fins are staggered relative to a direction of coolant flow through the coolant plate assembly.

In some aspects, the techniques described herein relate to a battery pack assembly, wherein the base sheet is vertically between the cell stack and the coolant plate assembly.

In some aspects, the techniques described herein relate to a battery pack assembly, wherein the first sheet and the second sheet extend vertically upward from the base sheet.

In some aspects, the techniques described herein relate to a battery pack assembly, wherein the cell stack is part of a traction battery pack assembly.

In some aspects, the techniques described herein relate to a method of thermal transfer within a battery pack, including: communicating thermal energy from a battery cell in a cell stack to a first sheet of a thermal energy transfer assembly; insulating the first sheet from a second sheet of the thermal energy transfer assembly using an insulation layer of the thermal energy transfer assembly; communicating thermal energy from the first sheet to a base sheet that is sandwiched between a coolant plate assembly and the cell stack; and communicating thermal energy from the base sheet to the coolant plate assembly.

In some aspects, the techniques described herein relate to a method, further including communicating thermal energy form the coolant plate assembly by communicating a liquid coolant through the coolant plate assembly.

In some aspects, the techniques described herein relate to a method, wherein the liquid coolant communicates through the coolant plate assembly along a plurality of staggered paths.

In some aspects, the techniques described herein relate to a method, wherein the first sheet and the second sheet are connected directly to the base sheet.

In some aspects, the techniques described herein relate to a method, wherein the base sheet and the coolant plate assembly are different materials.

In some aspects, the techniques described herein relate to a method, wherein the base sheet is copper.

The embodiments, examples and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

BRIEF DESCRIPTION OF THE FIGURES

The various features and advantages of the disclosed examples will become apparent to those skilled in the art from the detailed description. The figures that accompany the detailed description can be briefly described as follows.

DETAILED DESCRIPTION

This disclosure details example traction battery pack assemblies having a base sheet between a cell stack and a coolant plate assembly. The base sheet can facilitate thermal energy transfer between cells of the cell stack and the coolant plate assembly.

Figure 1:
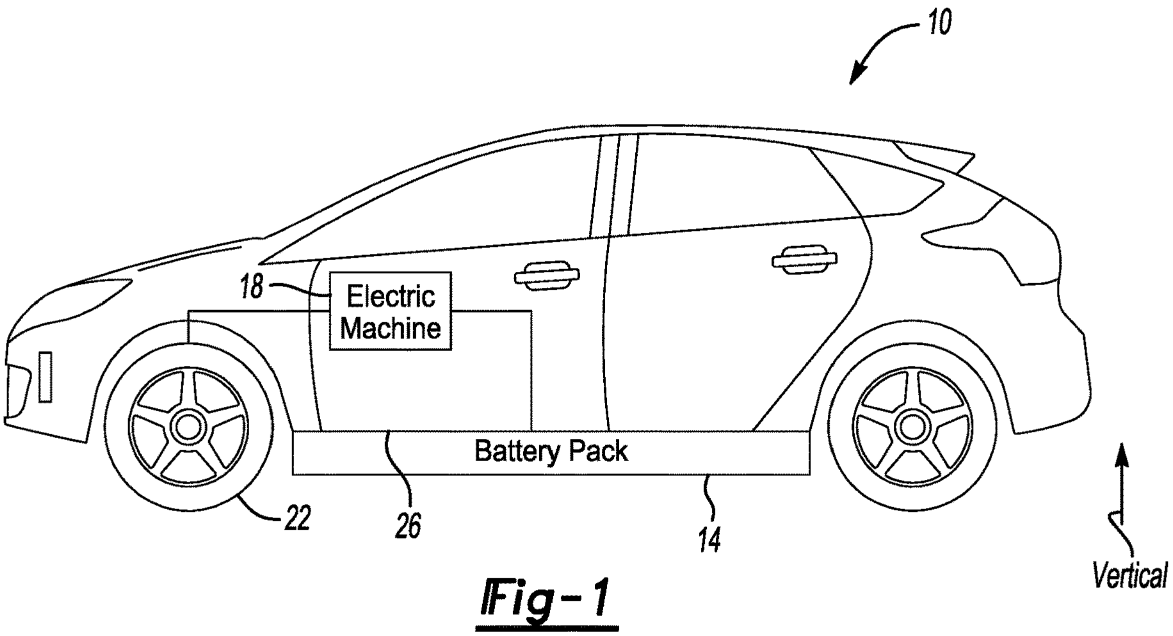
FIG. 1 illustrates a side view of an electrified vehicle having a traction battery pack.

With reference to FIG. 1, an electrified vehicle 10 includes a traction battery pack assembly 14, an electric machine 18, and wheels 22. The traction battery pack assembly 14 powers an electric machine 18, which can convert electrical power to mechanical power to drive the wheels 22. The traction battery pack assembly 14 can be a relatively high-voltage battery.

The traction battery pack assembly 14 is, in the exemplary embodiment, secured to an underbody 26 of the electrified vehicle 10. The traction battery pack assembly 14 could be located elsewhere on the electrified vehicle 10 in other examples.

The electrified vehicle 10 is an all-electric vehicle. In other examples, the electrified vehicle 10 is a hybrid electric vehicle, which selectively drives wheels using torque provided by an internal combustion engine instead of, or in addition to, an electric machine. Generally, the electrified vehicle 10 could be any type of vehicle having a traction battery pack.

Figure 3:
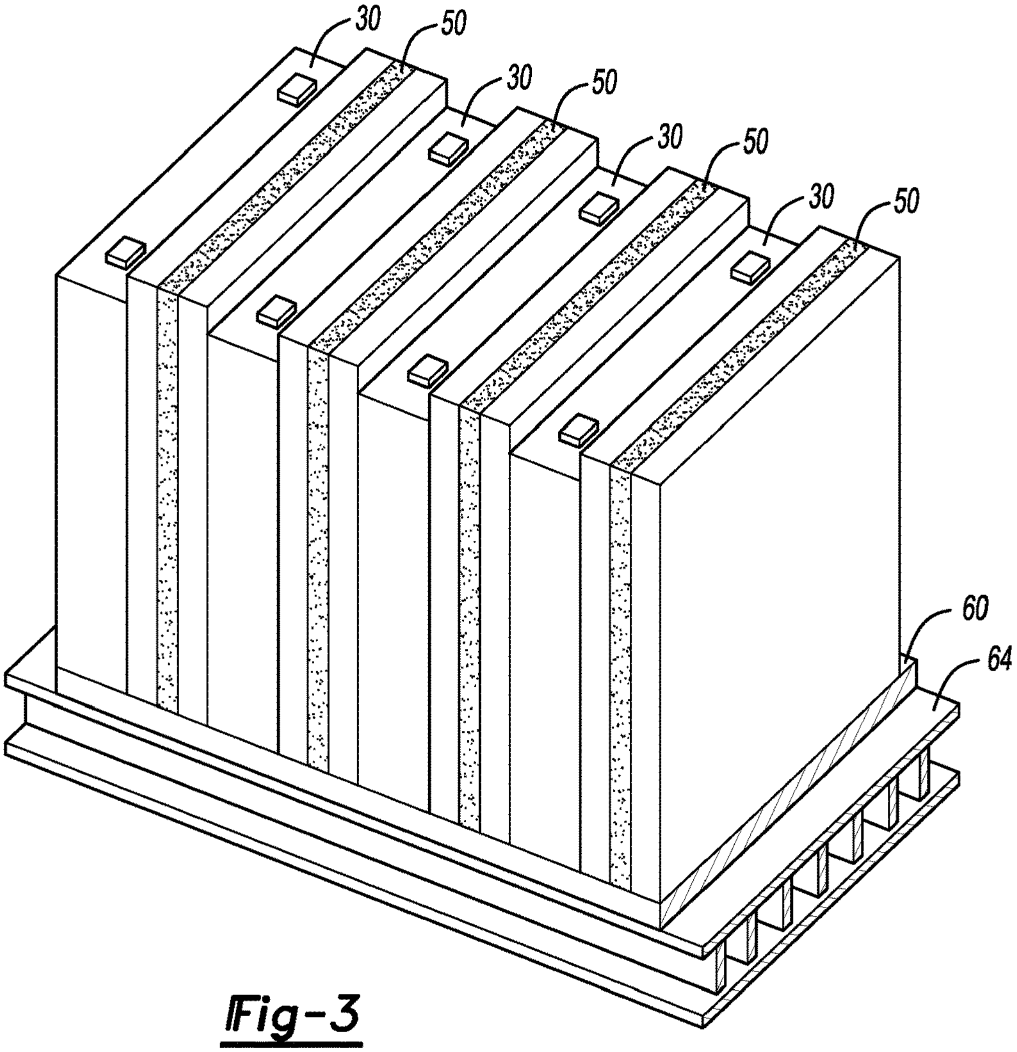
FIG. 3 illustrates a close-up view of a portion of a cell stack from the traction battery pack.
Figure 2:
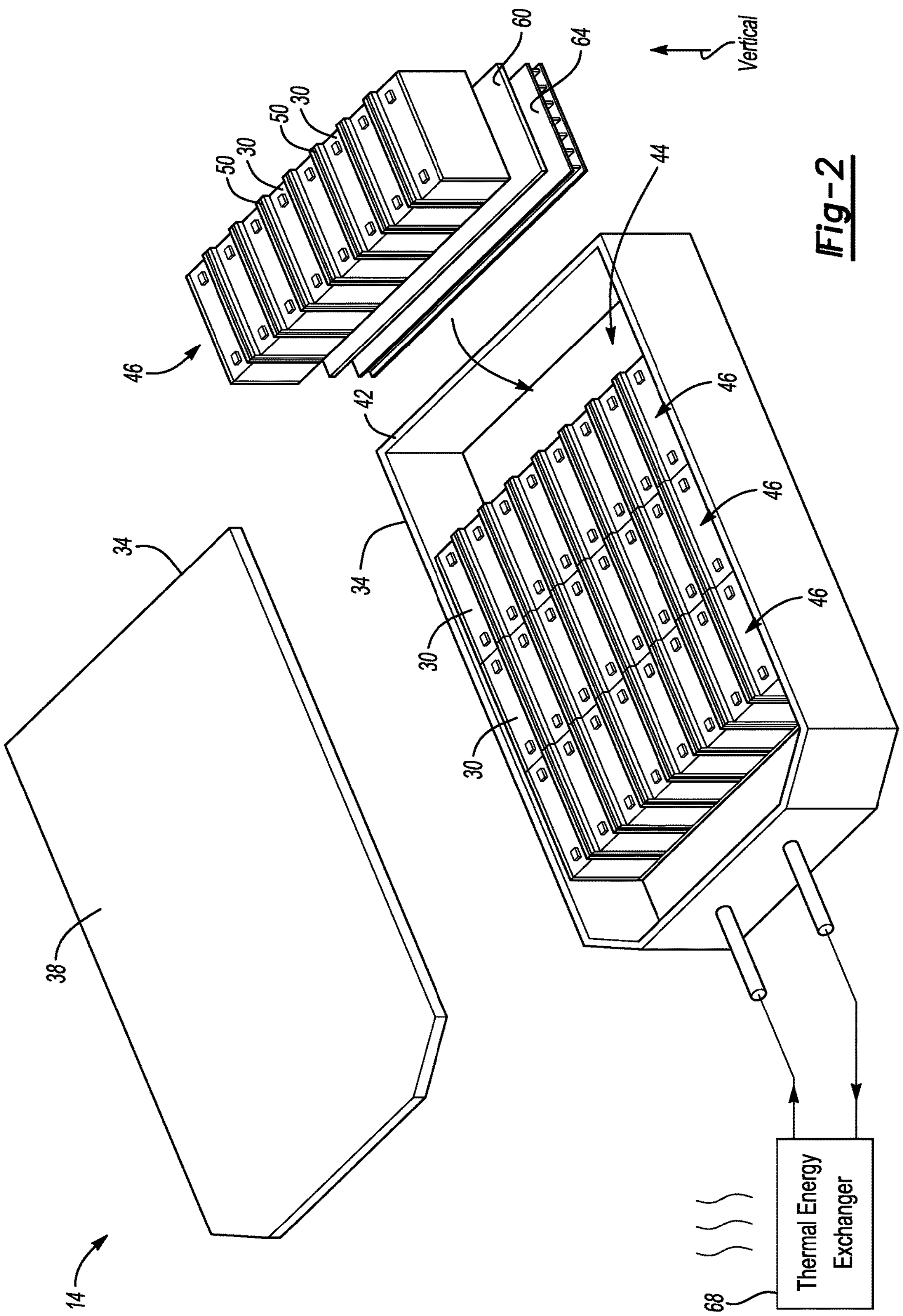
FIG. 2 illustrates an expanded perspective view of the traction battery pack of FIG. 1.
Figure 4:
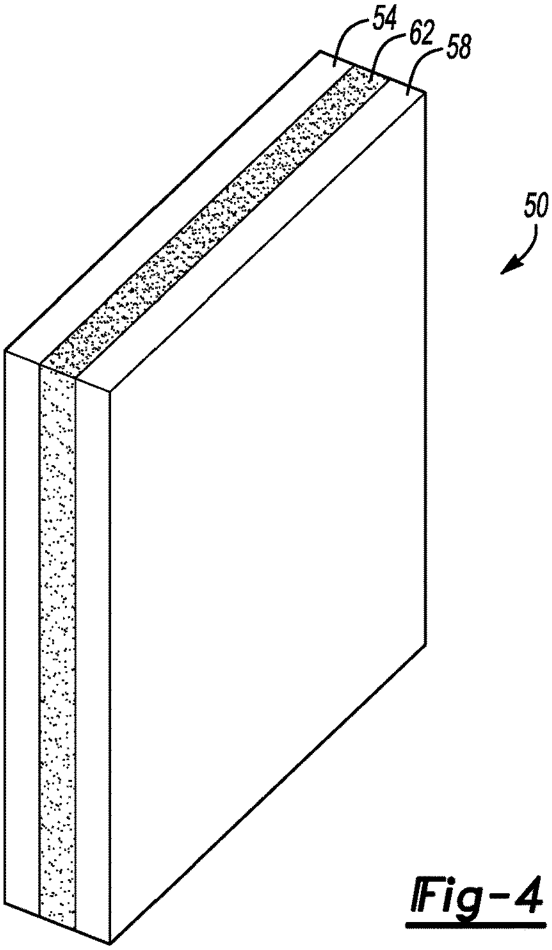
FIG. 4 illustrates a perspective view of a thermal energy transfer assembly from the traction battery pack of FIG. 1.

With reference now to FIGS. 2-4, the traction battery pack assembly 14 includes a plurality of battery cells 30 held within an enclosure assembly 34. In the exemplary embodiment, the enclosure assembly 34 includes an enclosure cover 38 and an enclosure tray 42. The enclosure cover 38 is secured to the enclosure tray 42 to provide an interior area 44 that houses the plurality of battery cells 30.

The plurality of battery cells (or simply, "cells") 30 are for supplying electrical power to various components of the electrified vehicle 10. The battery cells 30 are stacked side-by-side relative to one another to construct a cell stack 46. In this example, each cell stack 46 includes eight individual battery cells 30, and the battery pack 14 includes four cell stacks 46 within the interior area 44 of the enclosure assembly 34.

Although a specific number of battery cells 30 and cells stacks 46 are illustrated in the various figures of this disclosure, the traction battery pack assembly 14 could include any number of cells 30 and cell stacks 46. In other words, this disclosure is not limited to the specific configuration of cells 30 shown in FIGS. 2 and 3.

In an embodiment, the battery cells 30 are prismatic, lithium-ion cells. However, battery cells having other geometries (cylindrical, pouch, etc.) and/or chemistries (nickel-metal hydride, lead-acid, etc.) could alternatively be utilized within the scope of this disclosure.

Each of the cell stacks 46 includes a plurality of the cells 30 distributed along an axis A. The cell stacks 46 also include a plurality of thermal energy transfer assemblies 50 distributed along the axis A. Each of the thermal energy transfer assemblies 50 is disposed between axially adjacent cells 30 of the cell stack 46. Along the axis A, the cells 30 alternate with thermal energy transfer assemblies 50.

The thermal energy transfer assemblies 50 are a multi-layered assembly. The thermal energy transfer assemblies 50 each include a first sheet 54, a second sheet 58, and an insulation layer 62 sandwiched between the first sheet 54 and the second sheet 58. The first sheet 54 and the second sheet 58 can be a metal or metal alloy material having relatively high thermal conductivity. The first sheet 54 and the second sheet 58 are copper, in some examples. The insulation layer 62 could be foam.

Within the enclosure 34, the cell stacks 46 are disposed on a base sheet 60, which is disposed on a coolant plate assembly 64. The base sheet 60, in this example, is sandwiched between the coolant plate assembly 64 and the cell stack 46. The base sheet 60 is a relative thin sheet of material. The base sheet 60 is configured to communicate thermal energy from the first sheet 54 and the second sheet 58 to the coolant plate assembly 64. The base sheet 60 can be directly connected to the coolant plate assembly 64 using an adhesive, for example.

The first sheet 54 and the second sheet 58 rest on the base sheet 60 in direct contact with the base sheet 60. In some examples, the first sheet 54 and the second sheet 58 can be directly connected to the base sheet 60.

The first sheet 54 and the second sheet 58 extend vertically upward from the base sheet in this example. Vertical, for purposes of this disclosure, is with reference to ground and a generally orientation of the battery pack 14 when installed within the vehicle 10. The base sheet is vertically between the cell stack 46 and the coolant plate assembly 64.

Coolant circulates through the coolant plate assemblies 64 to, in this example, remove thermal energy from the battery pack 14. After the coolant takes on thermal energy within the enclosure 34, the coolant moves from the enclosure 34 to a thermal energy exchanger 68, such as a radiator. Thermal energy is releases from the coolant at the thermal energy exchanger 68. The coolant is then circulated back through the coolant plate assemblies 64 within the battery pack 14.

The thermal energy transfer assemblies 50 facilitate movement of thermal energy to the coolant plate assembly 64. In particular, each battery cell 30 is sandwiched between two sheets—the first sheet 54 of one of the thermal energy transfer assemblies 50 and the second sheet 58 of another of the thermal energy transfer assemblies 50. Thus, two sheets in direct contact with respective axially facing sides of one of the battery cells 30 can take on thermal energy from that battery cell 30. Thermal energy then moves through the sheets to the base sheet 60. Thermal energy spreads through the base sheet 60 and can then transfer from the base sheet 60 to the coolant plate assembly 64. The insulation layer 62 can help to prevent thermal energy from passing from one of the battery cells 30, through one of the sheets 54, 58, to another of the battery cells 30. Blocking sufficient thermal energy from passing to axially adjacent battery cells 30 can help to prevent thermal runaway conditions.

Figure 5:
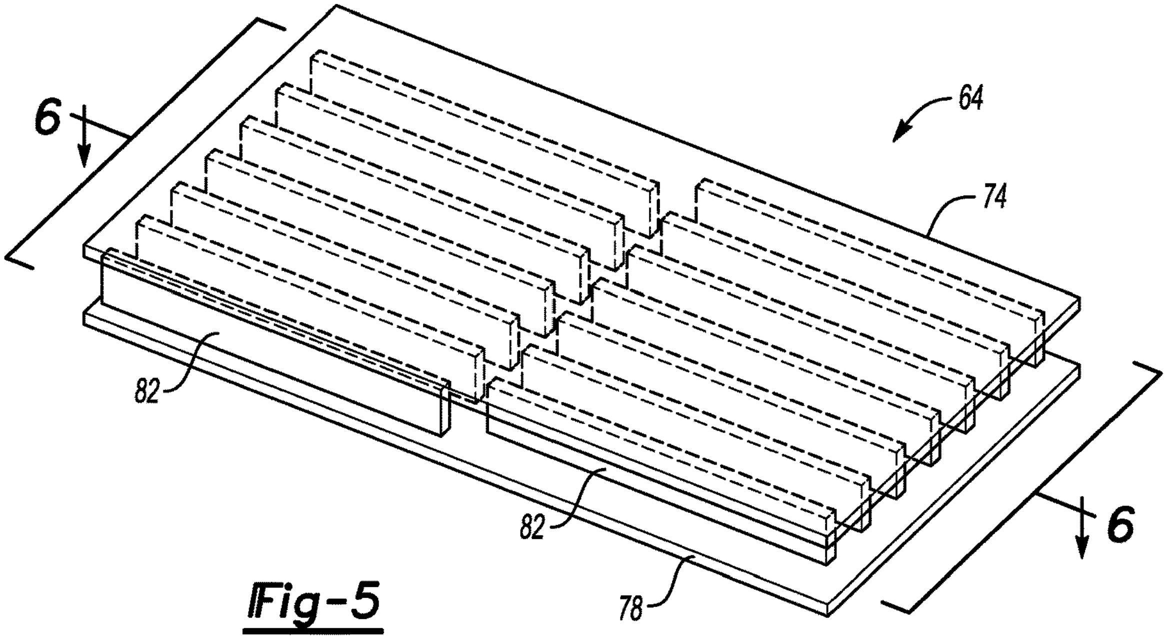
FIG. 5 illustrates a perspective view of a coolant plate assembly from the traction battery pack of FIG. 1.
Figure 6:
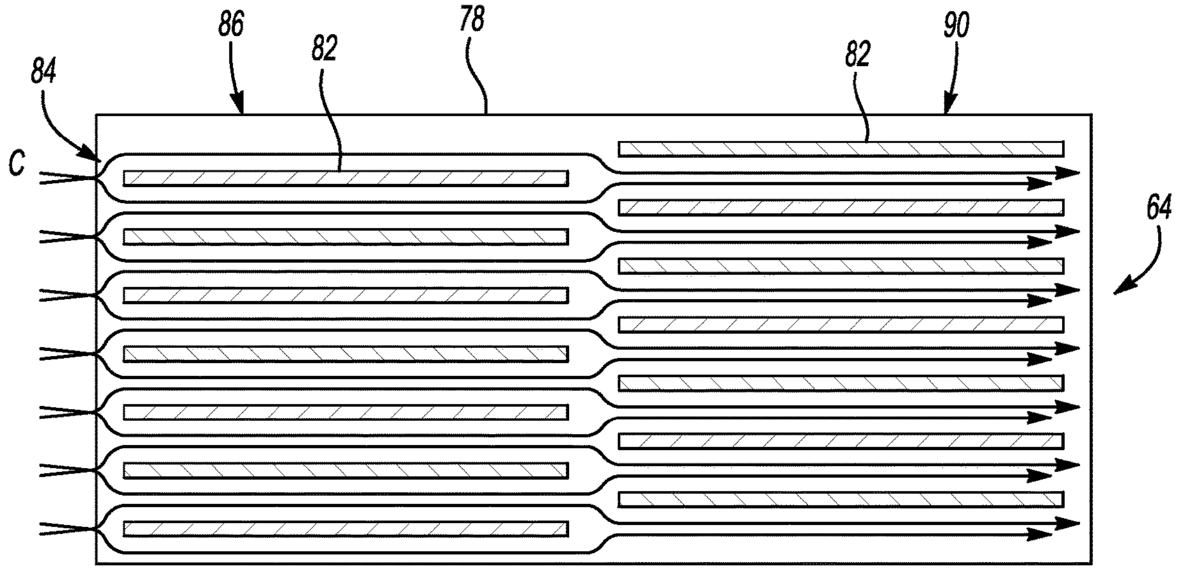
FIG. 6 illustrates a section view at line 6-6 in FIG. 5.

With reference now to FIGS. 5 and 6 and continued reference to FIGS. 2-4, the coolant plate assembly 64 can be a metal or metal alloy material, such as aluminum. The coolant plate assembly 64, in this example, include a first plate 74, a second plate 78 spaced a distance from the first plate 74, and a plurality of fins 82 extending between the first plate 74 and the second plate 78. The spacing establishes a plurality of paths 84 within the coolant plate assembly 64 that can be used to communicate coolant through the coolant plate assembly 64.

In this example, a first group 86 of the fins 82 is staggered relative to a second group 90 of fins 82 that is downstream from the first group 86. The staggering is relative to a general direction of flow of the coolant C through the coolant plate assembly 64. The staggering can introduce turbulence into the flow of coolant C through the coolant plate assembly 64, which can facilitate thermal energy transfer between the coolant and the coolant plate assembly 64.

Figure 7:
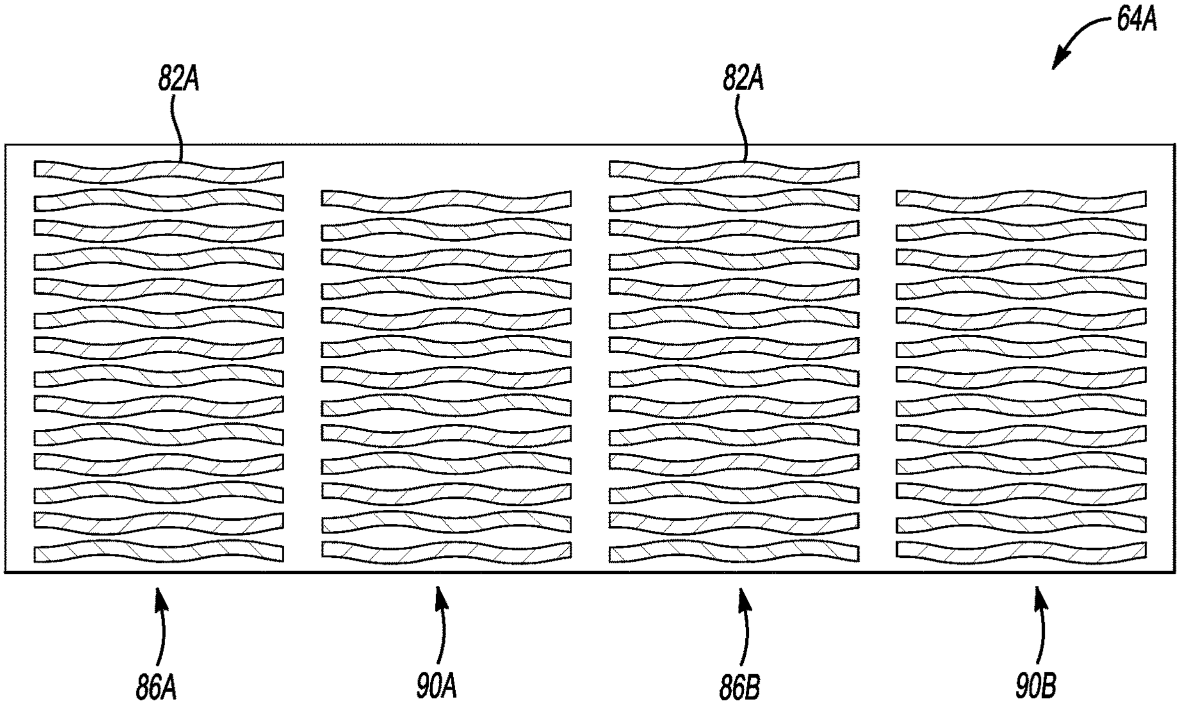
FIG. 7 illustrates a section view of a coolant plate assembly according to another example embodiment.

The fins 82 of the first group 86 and the second group 90 each extend linearly in this example. In another examples, as shown in FIG. 7, a coolant plate assembly 64A includes fins 82A of a first group 86A, second group 90A, a third group 86B, and a fourth group 90B. The fins 82A each have a have a wavy profile.

A method of communicating thermal energy from one of the battery cells 30 in the cells stacks 46 can first transfer thermal energy from the cell 30 to the first sheet 54 of the multilayered thermal energy transfer assembly 50. The method insulates the thermal energy from moving to the second sheet 58 of the thermal energy transfer assembly 50 using an insulation layer of the thermal energy transfer assembly. The thermal energy communicates from the first sheet 54 to the base sheet 60, which is sandwiched between the coolant plate assembly 64 and the cell stack 46. Thermal energy then communicates from the base sheet 60 to the coolant plate assembly 64. Within the coolant plate assembly 64, coolant C, which is a liquid coolant, takes on the thermal energy and removes it from the battery pack 14.

The preceding description is exemplary rather than limiting in nature. Variations and modifications to the disclosed examples may become apparent to those skilled in the art that do not necessarily depart from the essence of this disclosure. Thus, the scope of protection given to this disclosure can only be determined by studying the following claims.

What is claimed is:

1. A battery pack assembly, comprising:

a cell stack including a plurality of battery cells distributed along an axis and a plurality of thermal energy transfer assemblies distributed along the axis, each thermal energy transfer assembly disposed between axially adjacent battery cells within the plurality of battery cells, each thermal energy transfer assembly including a first sheet and a second sheet that sandwich an insulation layer;

a coolant plate assembly; and a base sheet sandwiched between the coolant plate assembly and the cell stack, the base sheet configured to communicate thermal energy from the first sheet and the second sheet to the coolant plate assembly.

2. The battery pack assembly of claim 1, wherein the first sheet and the second sheet are connected directly to the base sheet.

3. The battery pack assembly of claim 1, wherein the base sheet is a first material, and the coolant plate assembly is a different, second material.

4. The battery pack assembly of claim 3, wherein the first material comprises copper, wherein the second material comprises aluminum.

5. The battery pack assembly of claim 3, wherein the first sheet and the second sheet are copper.

6. The battery pack assembly of claim 1, wherein the coolant plate assembly includes paths configured to communicate a liquid coolant.

7. The battery pack assembly of claim 1, wherein the coolant plate assembly include a first plate, a second plate spaced a distance from the first plate, and a plurality of fins extending between the first plate and the second plate, wherein the coolant plate assembly is configured to communicate coolant between the first plate and the second plate.

8. The battery pack assembly of claim 7, wherein the plurality of fins are staggered relative to a direction of coolant flow through the coolant plate assembly.

9. The battery pack assembly of claim 1, wherein the base sheet is vertically between the cell stack and the coolant plate assembly.

10. The battery pack assembly of claim 9, wherein the first sheet and the second sheet extend vertically upward from the base sheet.

11. The battery pack assembly of claim 1, wherein the cell stack is part of a traction battery pack assembly.

12. A method of thermal transfer within a battery pack, comprising:

communicating thermal energy from a battery cell in a cell stack to a first sheet of a thermal energy transfer assembly;

insulating the first sheet from a second sheet of the thermal energy transfer assembly using an insulation layer of the thermal energy transfer assembly;

communicating thermal energy from the first sheet to a base sheet that is sandwiched between a coolant plate assembly and the cell stack; and communicating thermal energy from the base sheet to the coolant plate assembly.

13. The method of claim 12, further comprising communicating thermal energy form the coolant plate assembly by communicating a liquid coolant through the coolant plate assembly.

14. The method of claim 13, wherein the liquid coolant communicates through the coolant plate assembly along a plurality of staggered paths.

15. The method of claim 12, wherein the first sheet and the second sheet are connected directly to the base sheet.

16. The method of claim 12, wherein the base sheet and the coolant plate assembly are different materials.

17. The method of claim 12, wherein the base sheet is copper.

18. The battery pack assembly of claim 1, wherein the cell stack, base sheet, and coolant plate assembly are housed within an enclosure.

19. The battery pack assembly of claim 1, wherein the coolant plate assembly is disposed between the base sheet and a portion of an enclosure assembly that houses the cell stack, the base sheet and the coolant plate assembly.

20. The method of claim 12, wherein the cell stack, base sheet, and coolant plate assembly are housed within an enclosure.

* * * * *